United States Patent
Macias et al.

[19]

[11] Patent Number: 5,886,537
[45] Date of Patent: Mar. 23, 1999

[54] SELF-RECONFIGURABLE PARALLEL PROCESSOR MADE FROM REGULARLY-CONNECTED SELF-DUAL CODE/DATA PROCESSING CELLS

[76] Inventors: Nicholas J. Macias, 1672 E. Princeton Ave., Salt Lake City, Utah 84105; Lawrence B. Henry, III, 1241 N. Nash St., Arlington, Va. 22209; Murali Dandu Raju, 6508 Dearborn Dr., Falls Church, Va. 22044

[21] Appl. No.: 850,472

[22] Filed: May 5, 1997

[51] Int. Cl.[6] ............................. G06F 7/38; H03K 19/177
[52] U.S. Cl. .................................................. 326/40; 326/39
[58] Field of Search .................................. 326/38, 39, 40, 326/41

[56] References Cited

U.S. PATENT DOCUMENTS 4,034,356  7/1977  Howley et al. .
5,450,557  9/1995  Kopp et al. .
5,473,758  12/1995  Allen et al. ........................... 364/232.9
5,550,782  8/1996  Cliff et al. .

*Primary Examiner*—Jon Santamauro
*Assistant Examiner*—Daniel D. Chang

[57] ABSTRACT

A parallel processing system composed of a regular array of programmable logic devices, each of which can be configured to perform any logical mapping from inputs to outputs. The configuration of each device is specified by a small program memory contained inside each device. Any device's program memory can be read or written by any other device connected to it within the array. This facilitates the development of extremely parallel systems whose configuration can be modified at runtime, while distributing control of the array throughout the entire array itself. The resulting system is thus completely self-reconfigurable, avoiding the bottlenecks and critical failure points found in inherently externally-configured systems.

17 Claims, 13 Drawing Sheets

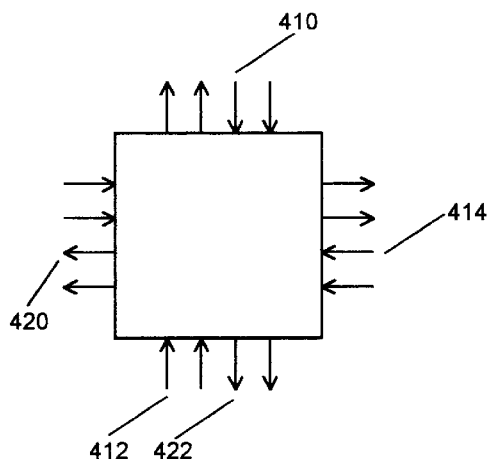
Fig. 7A
| 410 | 412 | | 414 | | | | | 422 | 420 | |
|---|---|---|---|---|---|---|---|---|---|---|
| DN | DS | DW | DE | CN | CS | CW | CE | DN | DS | DW | DE |
| 0 | 0 | 0 | 0 | 0 | 0 | 0 | 0 | 0 | 0 | 0 | 0 |
| 0 | 0 | 0 | 1 | 0 | 0 | 0 | 0 | 0 | 1 | 0 | 0 |
| 0 | 0 | 1 | 0 | 0 | 0 | 0 | 0 | 0 | 0 | 0 | 0 |
| 0 | 0 | 1 | 1 | 0 | 0 | 0 | 0 | 0 | 1 | 0 | 0 |
| 0 | 1 | 0 | 0 | 0 | 0 | 0 | 0 | 0 | 1 | 0 | 0 |
| 0 | 1 | 0 | 1 | 0 | 0 | 0 | 0 | 0 | 0 | 1 | 0 |
| 0 | 1 | 1 | 0 | 0 | 0 | 0 | 0 | 0 | 1 | 0 | 0 |
| 0 | 1 | 1 | 1 | 0 | 0 | 0 | 0 | 0 | 0 | 1 | 0 |
| 1 | 0 | 0 | 0 | 0 | 0 | 0 | 0 | 0 | 1 | 0 | 0 |
| 1 | 0 | 0 | 1 | 0 | 0 | 0 | 0 | 0 | 0 | 1 | 0 |
| 1 | 0 | 1 | 0 | 0 | 0 | 0 | 0 | 0 | 1 | 0 | 0 |
| 1 | 0 | 1 | 1 | 0 | 0 | 0 | 0 | 0 | 0 | 1 | 0 |
| 1 | 1 | 0 | 0 | 0 | 0 | 0 | 0 | 0 | 0 | 1 | 0 |
| 1 | 1 | 0 | 1 | 0 | 0 | 0 | 0 | 0 | 1 | 1 | 0 |
| 1 | 1 | 1 | 0 | 0 | 0 | 0 | 0 | 0 | 0 | 1 | 0 |
| 1 | 1 | 1 | 1 | 0 | 0 | 0 | 0 | 0 | 1 | 1 | 0 |
Fig. 7B
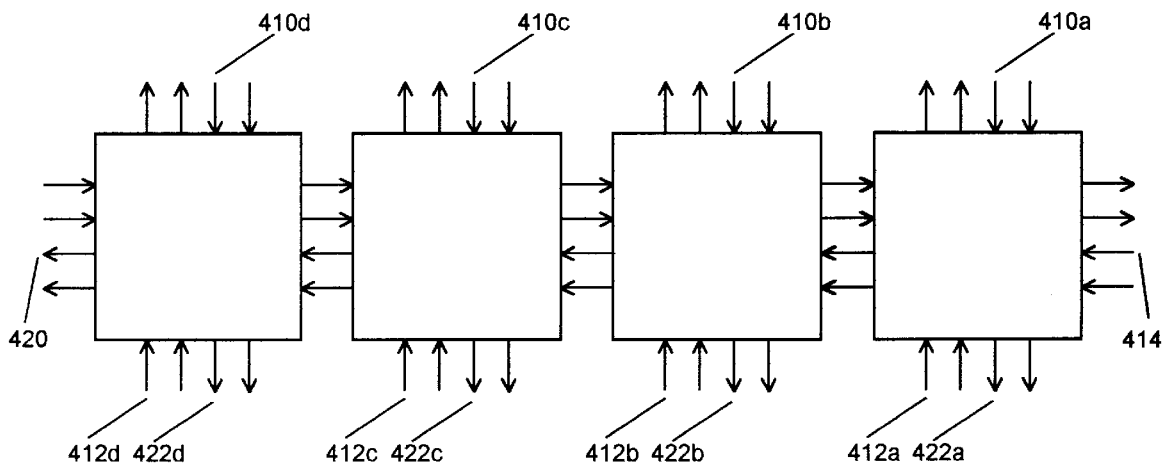
Fig. 7C

Fig. 10A

| 560 | 560 | 560 | 620 | 650 | 650 | 650 | 650 | 640 | 640 | 640 | 630 |
|---|---|---|---|---|---|---|---|---|---|---|---|
| DN | DS | DW | DE | CN | CS | CW | CE | DN | DS | DW | DE |
| 0 | 0 | 0 | 0 | 0 | 0 | 0 | 0 | 1 | 0 | 1 | 0 |
| 0 | 0 | 0 | 1 | 0 | 0 | 0 | 0 | 0 | 0 | 0 | 0 |
| 0 | 0 | 1 | 0 | 0 | 0 | 0 | 0 | 0 | 0 | 0 | 0 |
| 0 | 0 | 1 | 1 | 0 | 0 | 0 | 0 | 0 | 0 | 0 | 0 |
| 0 | 1 | 0 | 0 | 0 | 0 | 0 | 0 | 0 | 0 | 0 | 0 |
| 0 | 1 | 0 | 1 | 0 | 0 | 0 | 0 | 0 | 0 | 0 | 0 |
| 0 | 1 | 1 | 0 | 0 | 0 | 0 | 0 | 0 | 0 | 0 | 0 |
| 0 | 1 | 1 | 1 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 1 | 0 | 0 | 0 | 0 | 0 | 0 | 0 | 0 |
| 1 | 0 | 1 | 0 | 0 | 0 | 0 | 0 | 0 | 0 | 0 | 0 |
| 1 | 0 | 1 | 1 | 0 | 0 | 0 | 0 | 0 | 0 | 0 | 0 |
| 1 | 1 | 0 | 0 | 0 | 0 | 0 | 0 | 0 | 0 | 0 | 0 |
| 1 | 1 | 0 | 1 | 0 | 0 | 0 | 0 | 0 | 0 | 0 | 0 |
| 1 | 1 | 1 | 0 | 0 | 1 | 0 | 1 | 0 | 0 | 0 | 0 |
| 1 | 1 | 1 | 1 | 0 | 1 | 1 | 0 | 0 | 1 | 1 | 0 |

Fig. 10B

| 660 | 660 | 660 | 622 | 652 | 652 | 652 | 652 | 642 | 642 | 642 | 636 |
|---|---|---|---|---|---|---|---|---|---|---|---|
| DN | DS | DW | DE | CN | CS | CW | CE | DN | DS | DW | DE |
| 0 | 0 | 0 | 0 | 1 | 0 | 0 | 0 | 1 | 0 | 1 | 1 |
| 0 | 0 | 0 | 1 | 0 | 0 | 0 | 0 | 0 | 0 | 1 | 0 |
| 0 | 0 | 1 | 0 | 0 | 0 | 0 | 0 | 0 | 0 | 0 | 0 |
| 0 | 0 | 1 | 1 | 0 | 0 | 0 | 0 | 0 | 0 | 0 | 0 |
| 0 | 1 | 0 | 0 | 0 | 0 | 0 | 0 | 0 | 0 | 0 | 0 |
| 0 | 1 | 0 | 1 | 0 | 0 | 0 | 0 | 0 | 0 | 0 | 0 |
| 0 | 1 | 1 | 0 | 0 | 0 | 0 | 0 | 0 | 0 | 0 | 0 |
| 0 | 1 | 1 | 1 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 1 | 0 | 0 | 0 | 0 | 0 | 0 | 0 | 0 |
| 1 | 0 | 1 | 0 | 0 | 0 | 0 | 0 | 0 | 0 | 0 | 0 |
| 1 | 0 | 1 | 1 | 0 | 0 | 0 | 0 | 0 | 0 | 0 | 0 |
| 1 | 1 | 0 | 0 | 0 | 0 | 0 | 0 | 0 | 0 | 0 | 0 |
| 1 | 1 | 0 | 1 | 0 | 0 | 0 | 0 | 0 | 0 | 0 | 0 |
| 1 | 1 | 1 | 0 | 0 | 0 | 0 | 0 | 0 | 0 | 0 | 0 |
| 1 | 1 | 1 | 1 | 1 | 0 | 0 | 1 | 0 | 1 | 0 | 0 |

SELF-RECONFIGURABLE PARALLEL PROCESSOR MADE FROM REGULARLY-CONNECTED SELF-DUAL CODE/DATA PROCESSING CELLS

BACKGROUND OF THE INVENTION

The present invention relates to the field of cell-based parallel processing systems. In particular, it relates to a parallel processing system composed of a regular collection of processing units whose behavior is controlled by software contained within each unit. More particularly, it relates to a processing system composed of processing units which operate in one of two modes, one mode being a data processing mode, and the other being a code processing mode.

Currently there are numerous varieties of programmable logic devices (PLDs) available, which contain fixed hardware but whose specific behavior can be controlled by loading some form of software into the device. Such devices include U.S. Pat. Nos. 5,550,782 and 4,034,356. These and other configurable devices combine the speed of custom hardware with the flexibility of software. As such they find application in rapid prototyping, field-upgradeable systems, and other applications potentially requiring changes to the hardware-level behavior of the system after it is manufactured. Traditionally, such changes are made while the system is disabled, and are generally performed by something (often a human) outside the system itself.

There has been much recent interest in self-reconfigurable systems, which undergo self modification while running. For example, a system composed of a PLD array might be initially configured to execute a certain algorithm, and another part of the system might monitor the performance of this algorithm. While the initial algorithm may be well suited for the initial class of input data, it may be that the nature of the input data changes over time, and eventually the algorithm becomes sub-optimal. The monitor could modify the algorithm accordingly, and then reconfigure the PLDs to execute the new algorithm. A typical application for such a system would be a deep-space satellite, which necessarily has a limited amount of hardware onboard (due to weight and space restrictions) and often encounters phenomenon not anticipated when the system was built.

There have been attempts to build such systems using current PLDs, especially Field Programmable Gate Arrays (FPGAs). Typically, these systems contain two main pieces: a PLD array (collection of interconnected PLDs) and a controller (which monitors the PLD array and modifies it as needed). While this works adequately for small, simple systems, there are some fundamental limitations to this approach, arising from the fact that the PLD array is not itself self-reconfigurable. Rather, it must be configured by some external controller. Generally this means that as the size of the PLD array grows, the external controller must also grow. Additionally, these PLDs are generally controlled through relatively narrow channels, creating bottlenecks when attempting simultaneous reconfiguration of multiple PLDs. Furthermore, since the controller is external to the PLD array, the individual PLDs need some form of addressibility, which makes scaling the array difficult. The system is also susceptible to critical failures, since the controller is the only piece of the system which can modify the PLDs (and hence represents a critical failure point). Finally, while the system can become quite sophisticated by virtue of the PLDs' programmability, the external controller remains fixed, and can not itself be enhanced via reprogramming of its hardware.

While there have been solutions to certain of these problems (eg. U.S. Pat. No. 4,845,633), such solutions don't address the fundamental limitation of current PLD designs. Namely, a PLD is configured by loading code into it, and that code affects how it processes data. However, the data and code are fundamentally separate entities. So, for example, one PLD can not read the code from another PLD, modify it, and write it into a third PLD. While enhancements can be made to allow specific actions such as this, current systems fail to achieve a fundamental duality between data processing and code processing.

OBJECTS AND ADVANTAGES

Accordingly, several objects and advantages of the present invention are:

a) to provide a general-purpose PLD which can process input data according to an internal program;

b) to provide a PLD which can process input data according to an internal program, and is also capable of modifying another PLD's program, as well as having its program modified by another PLD;

c) to provide a self-reconfigurable parallel processing system composed of a regular collection of such PLDs;

d) to provide a PLD-based self-reconfigurable parallel processing system whose capacity for self-reconfiguration increases as the number of PLDs increases;

e) To provide a PLD-based self-reconfigurable parallel processing system which can achieve simultaneous reconfiguration of multiple PLDs;

f) to provide a PLD-based self-reconfigurable parallel processing system which can be scaled upward in size without increasing the complexity of the PLD interconnections;

g) to provide a PLD-based self-reconfigurable parallel processing system where the majority of the hardware in the system is identical, thus making the entire system more resistant to faults and failures.

h) to provide a PLD-based self-reconfigurable parallel processing system where the controller of the PLDs is itself composed of PLDs, and hence can be reconfigured for improved performance.

Further objects and advantages are to provide a system whose design is regular enough to allow easy manufacturing of larger systems from smaller ones. Still further objects and advantages will become apparent from a consideration of the ensuing description and drawings.

BRIEF DESCRIPTION OF THE DRAWINGS

FIG. 7A, FIG. 7B and FIG. 7C show an example of SDPs being used to implement a combinatorial circuit.

FIG. 10A and FIG. 10B show a sample truth table preceding and following C-mode operation.

SUMMARY

The present invention achieves a fundamental duality between data processing and code processing in a self-reconfigurable system, by building the system out of programmable processing elements which are themselves fundamentally self-dual. That is, these elements exchange information with other elements, and interpret that information as either data or code, depending on which of two modes they are currently operating in. The result is a parallel processing system whose hardware can be configured in virtually any way desired, while maintaining the fundamental capability of any number of pieces of the system to independently read, modify and write the hardware configuration of any other pieces of the system.

DESCRIPTION—FIRST EMBODIMENT

Figure 1:
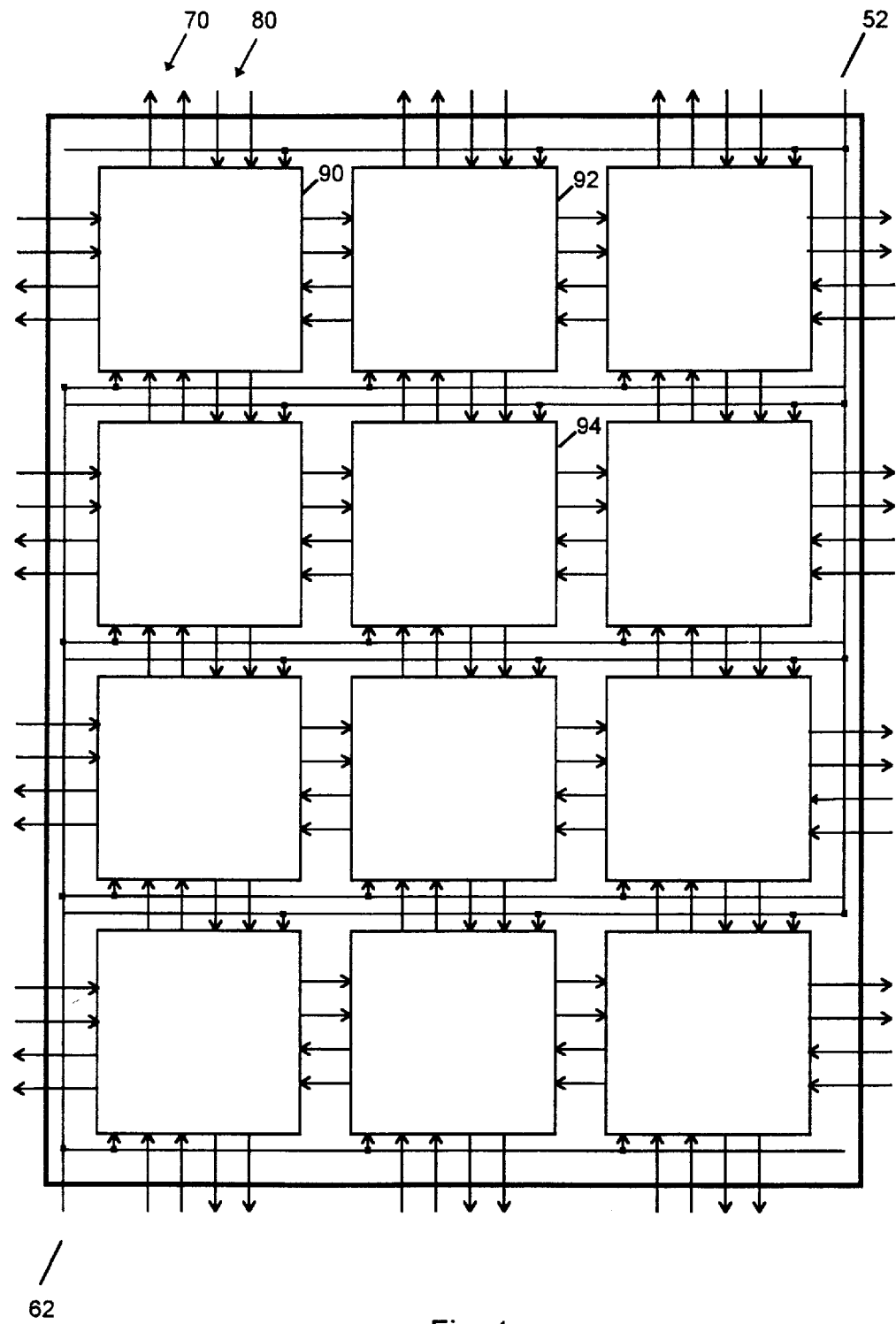
FIG. 1 illustrates a small collection of Self-Dual Processors (SDPs) which implement a sample embodiment of the present invention.

FIG. 1 shows a particular embodiment of the present invention using four-sided Self-Dual Processors (SDPs) connected in a two-dimensional rectangular grid. FIG. 1 contains 12 SDPs. Interior SDPs such as 94 are connected to four neighboring SDPs, corner SDPs such as 90 are connected to two neighbors, and all other border SDPs (such as 92) are connected to three neighbors.

In this configuration, each SDP has a pair of outputs 70 and a pair of inputs 80 on each of its four sides. Any inputs and outputs which are not connected to other SDPs are available as external signals from the system.

In addition to the inputs and outputs of each border SDP, there is a system-wide reset input 52 and a system-wide clock 62. These two inputs are propagated to every SDP within the system.

The particular size of the system is irrelevant to the connection topology of the SDPs. More SDPs can be added to any edge or edges of FIG. 1, as long as the connections between SDPs is preserved, and inputs 52 and 62 are propagated to all SDPs.

Figure 2:
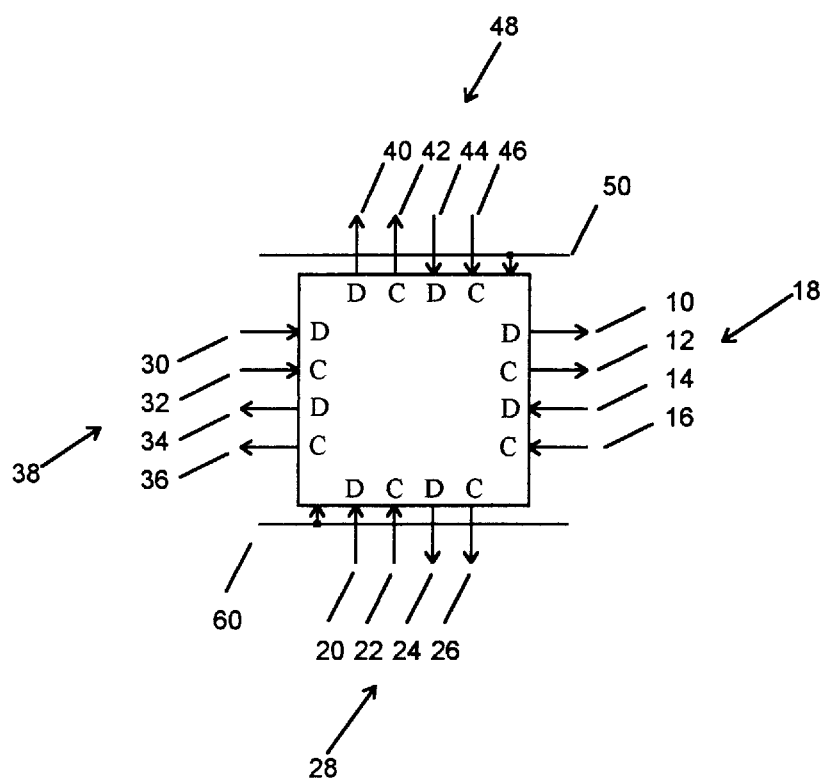
FIG. 2 illustrates a single SDP with all inputs and outputs labeled for reference.

FIG. 2 illustrates a single four-sided SDP (such as 90 in FIG. 1). We call side 48 North, side 28 South, side 38 West, and side 18 East. Each side has two inputs (44 and 46 on the North, 20 and 22 on the South, 30 and 32 on the West, and 14 and 16 on the East) and two outputs (40 and 42 on the North, 24 and 26 on the South, 34 and 36 on the West, and 10 and 12 on the East). These inputs and outputs are further broken into two sets, called D (data) and C (control). In FIG. 2, the D inputs are 44, 20, 30 and 14, the C inputs are 46, 22, 32 and 16. The D outputs are 40, 24, 34 and 10, and the C outputs are 42, 26, 36 and 12.

SDPs are connected in a two-dimensional rectangular grid by connecting appropriate inputs and outputs together. For example, in FIG. 1, SDP 90's output 10 is connected to SDP 92's input 30. Hence each SDP's inputs are supplied by either a neighboring SDP's outputs or an external source. Similarly, every SDP's outputs are presented to either a neighboring SDP's inputs or an external source.

Figure 3:
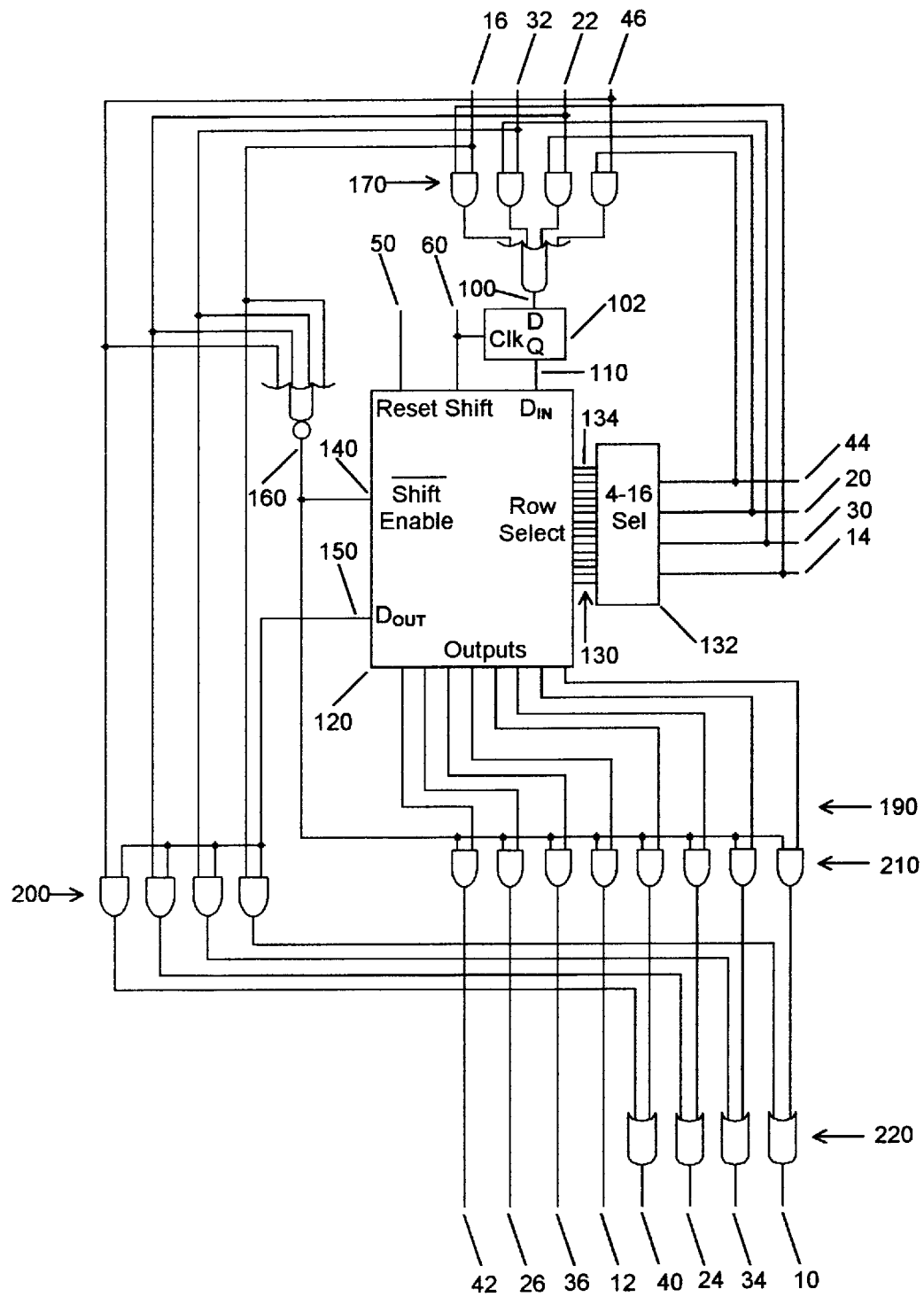
FIG. 3 shows a detailed schematic of the inside of a single SDP.

FIG. 3 shows a schematic for a four-sided SDP. This circuit has four D inputs (14, 20, 30 and 44) and four C inputs (16, 22, 32 and 46). 132 is a 4–16 selector, which accepts four inputs (44, 20, 30 and 14) and asserts one of its output select lines 130. Viewing the inputs as a four-bit binary number, with line 44 the most significant bit and line 14 the least significant bit, output select line 134 corresponds to an input of 0000, with the other output lines corresponding to consecutive increasing 4-bit input values 0001 through 1111. The selected output line is True, while the other output lines are False.

102 is a D-type flip flop. It accepts a single data bit 100, which is latched when clock 60 raises from False to True. The latched bit is always presented to output 110.

Figure 4:
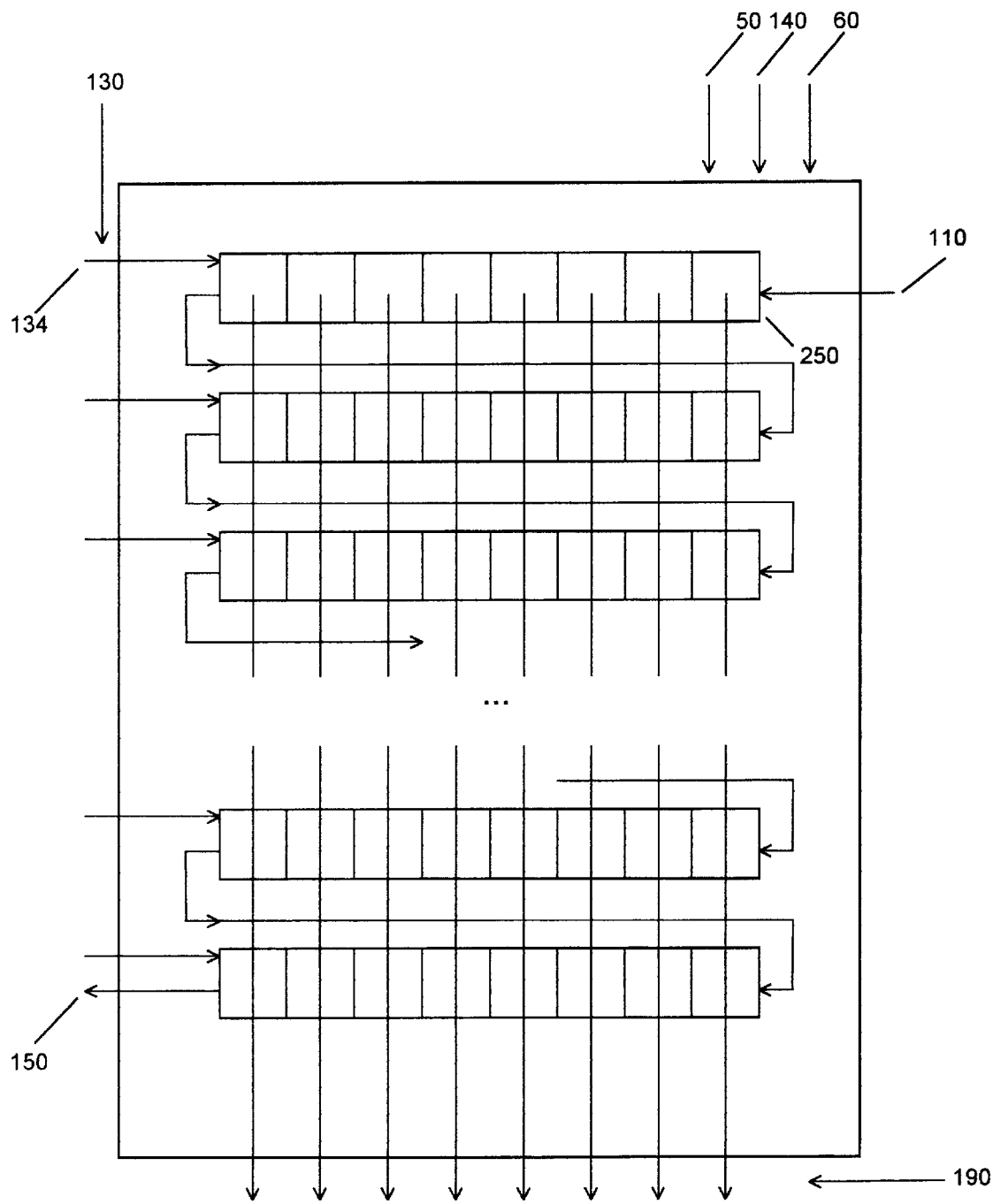
FIG. 4 shows a combination shift register/RAM used to hold the truth table for a SDP.

120 is a special type of shift register, organized as a 16-row 8-column memory. FIG. 4 shows a block diagram of this circuit. For the present embodiment (four-sided SDP), the shift register contains 128 elements, organized in 16 rows and 8 columns. Each element consists of a J-K master/slave flip flop 250. The first flip flop receives its input from 110, and passes its output to the input of the second flip flop, which passes its output to the third flip flop's input, and so on. Hence, the 128 flip flops form a single 128-bit shift register. The output from the last flip flop is presented on line 150.

Each flip flop has a reset input, and all the reset inputs are connected to a single input line 50 (FIG. 3). Additionally, each flip flop has a clock input which controls the loading of the flip flop. All the clock inputs are tied to a common clock signal, which is derived from inputs 60 and 140 (FIG. 3).

Finally, there is a series of row select lines 130 which select a single row of eight flip flops. The bits stored in the selected row are sent to outputs 190.

Figure 5:
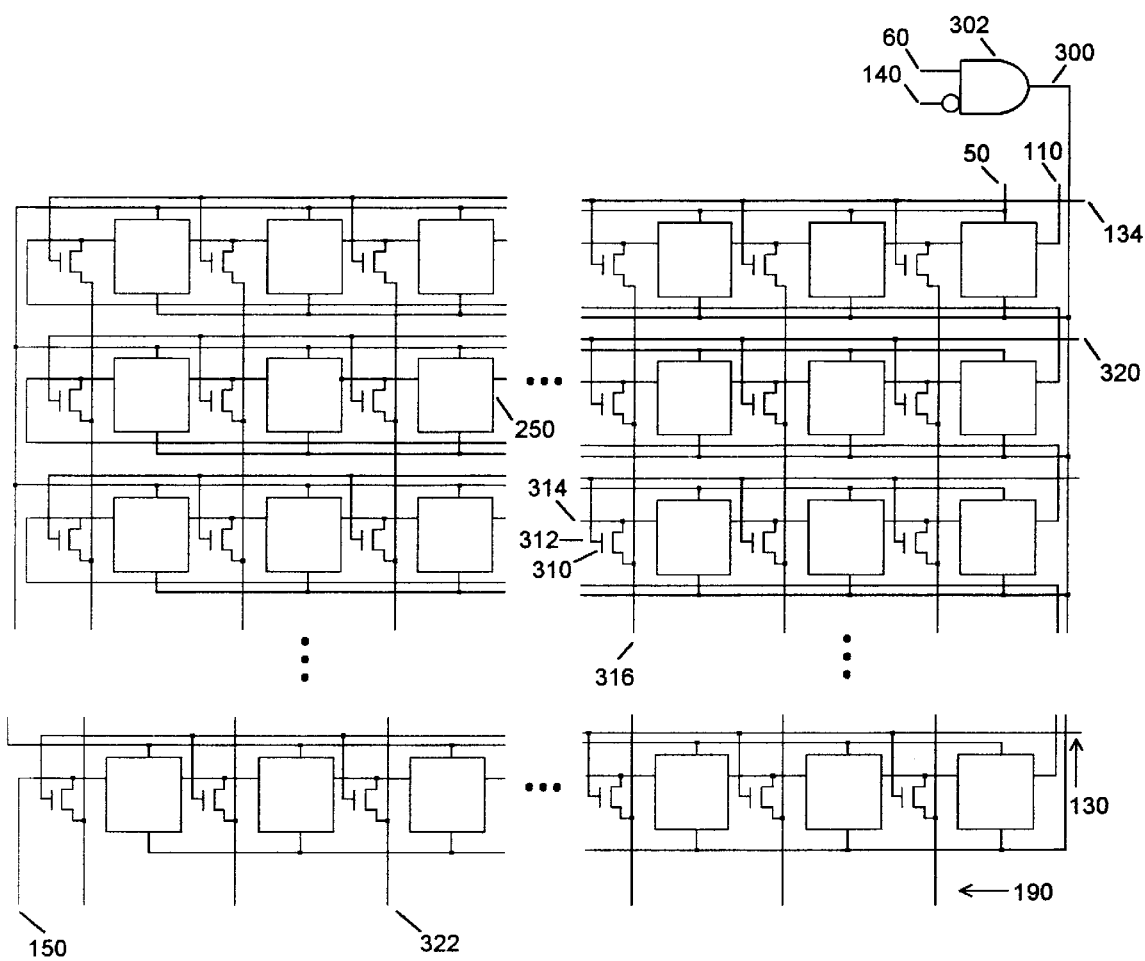
FIG. 5 shows a detailed schematic for the shift register/RAM.

FIG. 5 shows further details of shift register 120. Each J-K master slave flip flop 250 has its output connected to the next stage's input, with the left-most flip flop of one row connected to the right-most flip flop on the next row. The reset lines are tied together to input 50, while the clock inputs are connected to the output of AND gate 302. This AND gate combines shift signal 60 and shift enable line 140.

The output of each flip flop is additionally connected to a device 310, which is finctionally equivalent to an n-type transistor (which connects its input 314 and output 316 when its gate 312 is high). The outputs of each flip flop in any given column are connected via these devices 310 to a common output line 190. The gates of each device 310 in any given row are connected to a row select line 130.

Figure 6:
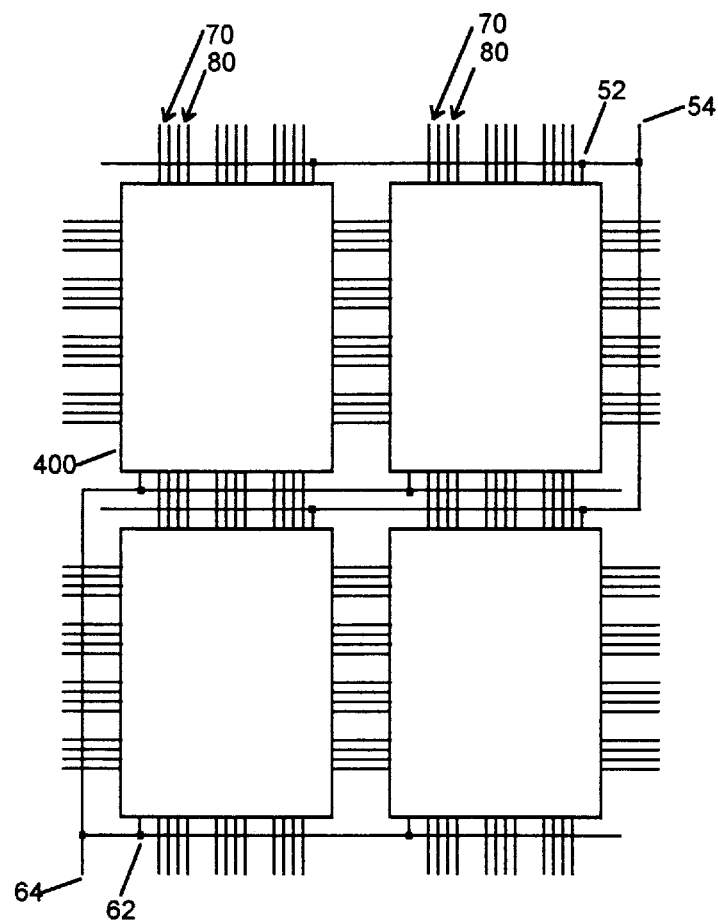
FIG. 6 shows a set of SDP arrays configured to form a larger array.

FIG. 6 shows how a collection of SDP arrays 400 are themselves arrayed to form a larger processing grid. The inputs and outputs of one SDP array are connected to the outputs and inputs of a neighboring SDP array, following the same topology by which individual SDPs are connected to form an array such as FIG. 1. The reset inputs 52 are all connected to a common reset line 54, and the clock inputs 62 are connected to a common clock line 64. Of course, larger grids can be constructed, either by increasing the number of SDPs in FIG. 1, or increasing the number of SDP arrays 400 in FIG. 6, or by repeated application of the arraying method depicted in FIG. 6, where each block 400 is any regularly-connected array of SDPs.

OPERATION—FIRST EMBODIMENT

A SDP exchanges a single bit of information with each neighbor via its D lines (40 and 44 for the Northern neighbor, 24 and 20 for the Southern, 34 and 30 for the Western, and 10 and 14 for the Eastern in FIG. 2). The specifics of this exchange, namely how input is processed and how outputs are generated, depends on which of two modes the SDP is currently operating in: D-mode or C-mode.

The current operating mode of a SDP is controlled by its C inputs (46, 22, 32 and 16). If any C inputs are set to True, the SDP is in C-mode, otherwise it is in D-mode. Additionally, the C outputs (42, 26, 36 and 12) control the operating mode of a SDP's neighbors, since they are C inputs to those neighbors.

If a SDP is in D-mode, it treats its D inputs as data, using them as inputs to an internally-stored program, and the outputs from that program are sent to the C and D output lines. If a SDP is in C-mode, it treats its D inputs as new program information, and presents its previous program to the D output lines. Thus a SDP in C-mode can be programmed with a particular program, which is then executed by placing the SDP in D-mode.

In addition to the C and D inputs and outputs, FIG. 2 shows two additional inputs. Input 50 is a reset line, which resets a SDP's internal program to some initial state. Line 50 of each SDP is connected to line 52 in FIG. 1, so that all SDPs may be reset to their initial state from a single reset line. Input 60 is a clock input, which is used to control the programming of a SDP in C-mode. Line 60 of each SDP is connected to line 62 in FIG. 1, so that all SDPs may be clocked from a single line.

FIG. 3 shows how a SDP behaves in response to different C and D input combinations. The D-inputs 14, 20, 30 and 44 are send to selector 132, which assert exactly one of its output lines 130. The asserted line selects a single row from shift register 120, and the values in that row are sent to outputs 190. The C inputs 16, 22, 32 and 46 are NORed to produce signal 160 which indicates the current mode of the SDP (160=True for D-mode, 160=False for C-mode).

If the SDP is in D-mode, input 140 disables shifting of 120, but still allows outputs 190 to be selected by inputs 130. In this mode, outputs 190 are passed by AND gates 210. Since the C inputs 16, 22, 32 and 46 are all False, AND gates 200 all output zero, which causes OR gates 220 to pass their inputs through unchanged. Thus the outputs 190 from the shift register 120 are presented to the SDP outputs 10, 34, 24, 40, 12, 36, 26 and 42.

Hence, when a SDP is in D-mode, the 16×8 memory in 120 is effectively a truth table of the SDP's input-to-output mapping. The D inputs 14, 20, 30 and 44 select a particular row of the truth table, and the bit values in the 8 columns are sent to the SDP's 8 outputs.

If line 50 is asserted, then shift register 120 is reset to an initial state. In the most anticipated embodiment, this state is all zeroes, i.e., the SDP's truth table would contain all zeros following a reset via line 50. Note however that each flip flop in shift register 120 could be configured at manufacture time to either set (value=True) or clear (value=False) in response to reset signal 50. In this case, reset line 50 would load a non-trivial truth table in the SDP. Additionally, each SDP's shift register 120 could be configured to reset to a different initial state, depending on where it is within the array. In this case, line 50 would effectively bootstrap the system, by resetting each SDP to some predetermined state.

If the SDP is in C-mode, line 160 is False, which feeds shift enable input 140 to allow shifting of 120. In this case, at least one of the C inputs (16, 22, 32 and 46) must be True. AND gates 170 pass the corresponding D inputs for any C inputs which are True. These are ORed together to produce signal 100. This signal is True if, on any side where the C input is True, the D input is also true. Line 100 is sent to the D input of D-type flip flop 102. This flip flop is clocked by SDP clock input 60. 102 is a positive-edge triggered flip flop. Hence, when the clock input 60 raises from low to high, flip flop 102 latches a True if any D input is True where a corresponding C input is True. Otherwise, 102 latches a False. This latched value is presented on line 110.

In this way, a SDP which has asserted a C output (thereby placing a neighboring SDP in C-mode) can specify new programming information to its neighbor via its D output.

In C-mode, AND gates 210 will output False since 160 is False. This means C outputs 12, 26, 36 and 42 of the SDP are all False. Furthermore, OR gates 220 now simply pass their inputs (from AND gates 200) through to their outputs. On any side where the C input is False, AND gates 200 will output False, and hence the corresponding D output (10, 24, 34 or 40) will be False.

If, however, a given C input is True, then line 150 is passed by a corresponding AND gate 200 to a corresponding OR gate 220, which thus passes line 150 to the corresponding D output (10, 24, 34 or 40). Hence, if a C input is False, the corresponding D output is also False, and if a C input is True, the corresponding D output comes from line 150.

In this way, a SDP which has asserted a C output (thereby placing a neighboring SDP in C-mode) can read the neighbor's current programming information via its D input.

Clock input 60 is also connected to the shift register's shift input. When this clock drops from high to low, shift register 120 shifts left one bit (assuming reset line 50 is low). The previous-to-last bit now becomes the last bit, and is presented on line 150, while the former last bit is now lost. The first bit is shifted into the second position, and input line 110 is used to supply the new first bit.

Thus, shift register 120 contains the SDP's program in the form of a truth table. In D-mode, the D inputs select a single row from the truth table, and the bits in that row drive the C and D outputs. In C-mode, this truth table can be read from the D outputs wherever a C input is True. The corresponding D inputs are sampled on to the rising edge of 60, and the sampled values are shifted into the truth table (on the falling edge of 60), thus loading a new program into the SDP.

There is a fundamental duality between the C- and D-modes of a SDP. In each mode, there is an information exchange involving the SDP's internal program: in D-mode, the SDP exchanges data, using its internal program to transform inputs to outputs (the internal program is treated as code); in C-mode, the SDP exchanges code, using its internal program as the destination and source of its inputs and outputs (the internal program is treated as data). The fact that a single SDP is capable of operating in either mode (as opposed to separate C- and D-mode devices) is central to the power and versatility of the present invention. Additionally, this self-duality is inherent in the design of the SDPs, and is achieved without any additional outside structure. This fact separates a SDP array from, say, an FPGA-based system in which certain cells' outputs are redirected to the programming inputs of the array. The former is completely flexible in how one SDP affects another, while the latter has fixed constraints based on the (fixed) nature of the external structure.

FIG. 5 shows how shift register 120 performs these operations. Each stage of the shift register 250 is a J-K master/slave flip flop, with input 110, output 314, clock 300 and reset line 50. If the reset line is high, the flip flop is reset to its initial state (usually zero). If the reset line is low, the device operates as follows. When the clock raises from low to high, incoming bit 110 is latched internally, but output 314 remains fixed. When the clock falls from high to low, output 314 changes to reflect the stored value. Since each stage's output is connected to the next stage's input, and since all the clock inputs are tied together, the collection of flip flops operates as a single shift register, shifting one bit each time the clock transitions from high to low.

Clocking is controlled by two inputs, 60 and 140. 60 is an external clock, and 140 is a shift enable. If 60 is high and 140 is low, AND gate 302 produces a high signal on shift register clock line 300. Otherwise, line 300 is low.

Each of the row select lines 130 is connected to the gate of a pass-device 310. So, for example, if select line 320 is high (and all other select lines are low), then the pass-devices in the second row all have a True value on their gates 312. This connects the output of each flip flop in the second row to the eight output lines 190, while the outputs from flip flops in other rows are effectively disconnected from the output lines 190. Thus row select lines 130 choose which eight flip flops will present their outputs to the output lines 190. Again, if select line 320 is high, then the flip flop labeled 250 will present its output on line 322, while all other flip flops in that column are disconnected from output line 322.

The first flip flop's input is supplied by input line 110, and the last flip flop's output is sent to output line 150. Finally, all flip flops can be reset by asserting line 50.

While the above specification completely describes the operation of a single SDP, it does not illustrate how a collection of SDPs is programmed and used to perform usefully work. The following are some samples of how a SDP array can be configured.

FIG. 7A shows schematically a single SDP configured to function as a one-bit adder. It accepts one bit from the North (410), a second from the South (412), and an incoming carry from the East (414). It produces an output sum (422) and an outgoing carry (420). FIG. 7B shows the corresponding truth table for this adder. In this case, the data input from the West is ignored, and it is assumed that all the C inputs are low. The West and South data outputs (420 and 422) are generated as shown in the table. All other outputs are low for all input combinations.

FIG. 7C shows four similarly-programmed SDPs arranged side-by-side to function as a four-bit ripple-carry adder. This circuit accepts two four-bit numbers (410a–410d and 412a–412d) and an initial incoming carry 414. It produces a four bit sum (422a–422d) and an outgoing final carry 420. This is an example of how SDPs can be used as standard combinatorial circuits.

The outputs shown in the right side of FIG. 7B show the 128 bits which would be loaded into shift register 120 of each SDP, with the bits organized as in FIG. 4. In general, we can write such a truth table symbolically with a set of equations. In this case, the equations would be:

$DW=SE+NE+NS$ $DS=N.xor.S.xor.E$ using standard Boolean logic. It's understood that the terms on the right refer to data inputs (i.e., S means DS, 412 in FIG. 7A). It's further understood that any outputs not specified in such a set of equations implement the NULL function, i.e., their value is zero for all input combinations.

Figure 8A:
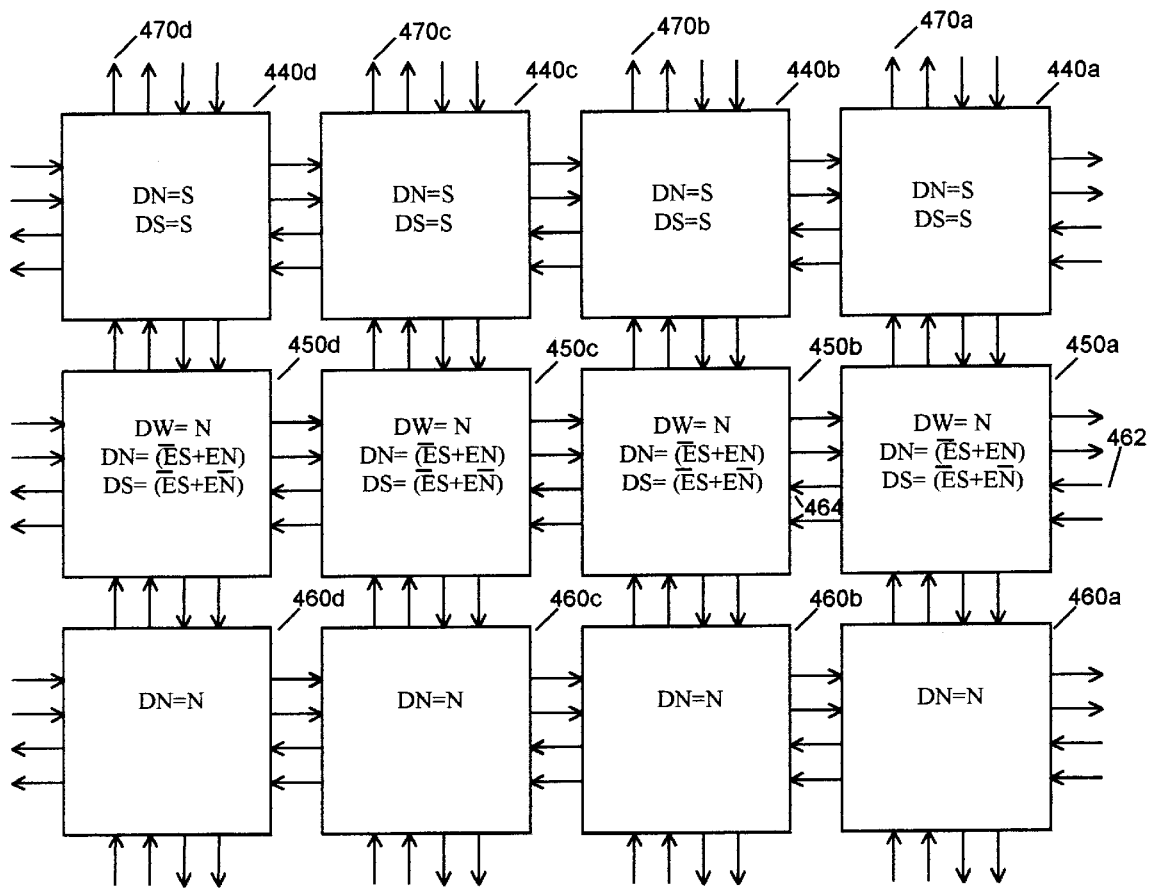
FIG. 8A, FIG. 8B and FIG. 8C show an example of SDPs being used to implement a sequential circuit.

FIG. 8A shows twelve SDPs configured to operate as four toggle flip flops, cascaded to form a four-bit counter. 440a, 450a and 460a together form a single toggle flip flop. The input to this flip flop is line 462, and the output is presented on 470a. Additionally, the output is presented to 464, which is also the clock input for the flip flop made from 440b, 450b and 460b.

The top SDP of each flip flop (e.g. 440a) takes a data bit in from the South, echoes it back to the South, and copies it to the North. This represents the current value of the flip flop. Similarly, 460a takes a bit from the North and echoes it back to the North. These two SDPs form the feedback paths of the flip flop.

Figure 8B:
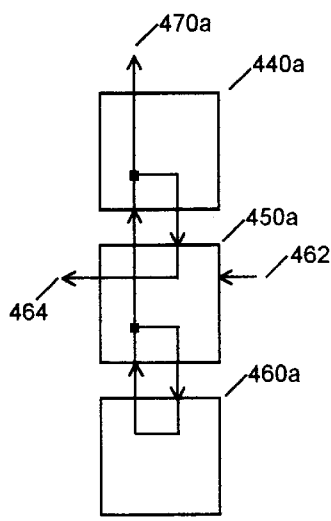

The middle SDP 450a performs one of two operations, depending on its clock input 462. If 462 is low, the 450a echoes its Southern input back to the South, and also passes it to the North. In this state, 450a and 460a together latch the flip flop's current value. A symbolic presentation of this state is shown in FIG. 8B.

Figure 8C:
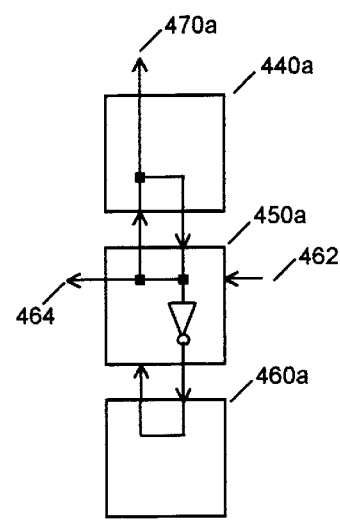

When the clock 462 is high, then 450a echoes its Northern input back to the North, which preserves the output value of the flip flop. Additionally, it passes a complemented copy of its Northern input to the South, so that 460a receives (and echoes back) the opposite of the flip flop's current value. This state is shown symbolically in FIG. 8C.

Finally, when clock 462 returns to a low value, this complemented value is echoed South by 450a, and becomes the flip flop's new bit value. Hence, the flip flop's output 470a toggles each time the input clock 462 falls from high to low.

When all four flip flops are combined as shown in FIG. 8A, the result is a four bit counter, whose value is presented on 470d, 470c, 470b and 470a. Each time clock line 462 falls from high to low, the value of this counter increases by one.

This example illustrates one way in which SDPs can be configured to form sequential circuits, including memories.

The above examples only show SDPs operating in D-mode. That is, they have been configured with fixed programs, which they execute continually to map their inputs to outputs. The following examples discuss the C-mode operation of SDPs. When a given SDP is in C-mode (meaning one or more C inputs are high), it's internal program is simultaneously read and written by any neighboring SDPs which are driving those high C inputs. Data arriving on the D inputs are used to load the first bit of the shift register, while the last bit of the shift register is presented as outgoing data. Shifting occurs on the falling edge of the system clock.

Figure 9:
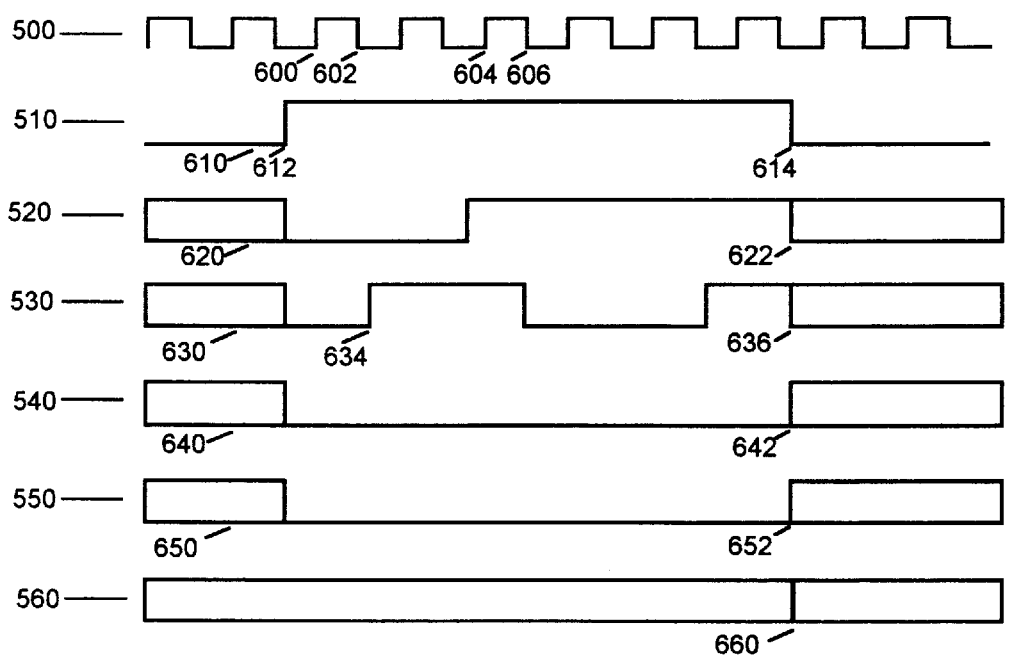
FIG. 9 shows a timing diagram for C-mode operation of a SDP.

FIG. 9 shows a timing diagram for a typical programming (C-mode) operation. In this example, a SDP is being controlled only by a neighbor on the East. FIG. 10A shows the truth table prior to the C-mode operation.

In FIG. 9, 500 shows the system clock. 510 shows the C input from the East, 520 is the D input from the East, and 530 is the D output to the East. 540 represents the D outputs from the other three sides (West, South and North), 550 the C outputs from the other three sides, and 560 the D inputs from the other three sides.

Initially, 510 is low (610), so the SDP is in D-mode. In this state, 630, 640 and 650 come directly from the truth table shown in FIG. 10A, depending on the D inputs 620 and 560.

At 612, line 510 goes high, which places the SDP into C-mode. The Eastern D output 530 now reflects the bit value in location 680 of the truth table (FIG. 10A), zero in this case. The other D outputs 540 and all C outputs 550 go low, and remain that way throughout the C-mode operation. D inputs 560 are irrelevant during this operation, since they come from sides where the corresponding C input is low.

On the next rising edge 600 of the clock, the SDP samples the Eastern data input 520 and latches it internally (zero in this case). On the falling edge 602 of the clock, the shift register shifts left one bit. The latched bit (zero) is shifted into the lowest bit of the truth table (682 in FIG. 10A), and the previous highest bit is lost. The previous next-to-highest bit 684 now moves into the highest position 680, and is immediately presented on the D output 530. This bit is a one, so output line 530 now goes high (634).

The next rise and fall of clock 500 are the same as above. A zero is latched on the rising edge, the truth table shifts on the falling edge, the latched zero is loaded into position 682, and the new highest bit (position 680) is presented on D output 530 (still a one).

On rising clock edge 604, the SDP now latches a one from D input 520. On falling edge 606, the latched one is shifted into the truth table, and the previous highest bit of the truth table is presented on 530, a zero in this case. The next rise and fall of the clock are identical.

The SDP remains in C-mode for two more cycles (a total of six clock rises and falls), until the C input 510 drops low at 614. At this point, the SDP enters D-mode. FIG. 10B shows the truth table at this point. The new truth table is precisely the original table (FIG. 10A) shifted left 6 bits (one for each clock cycle), with the six highest bits lost, and the 6 lowest bits 690 coming from the rising-edge-sampled inputs from 520.

In D-mode, the SDP now generates D outputs 636 and 642 and C outputs 652 based on the current D inputs 622 and 660. The clock 500 is effectively ignored as long as the SDP remains in D-mode.

This example, though somewhat arbitrary, illustrates the fundamental steps in C-mode operation. Basically, a SDP is placed in C-mode by raising a C input, the current program is read via the corresponding D output, and a new program (possible the same as the old) is loaded via the corresponding D input.

Figure 11:
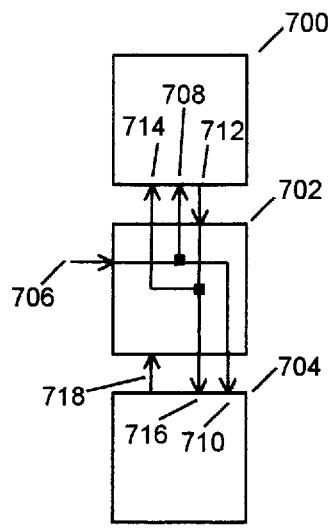
FIG. 11 shows a SDP replicator.

FIG. 11 shows a more useful circuit, a SDP replicator. This circuit consists of three SDPs. 702 is the actual replicator, 700 is called the source cell, and 704 is called the target cell. The function of the replicator is to read the program contained in the source SDP and copy it into the target SDP.

The replicator 702 is characterized by the following equations:

$$CN=W;\ CS=W;\ DN=N;\ DS=N$$

The replication is started by raising 706. This line is connected to both the C input of 700 (708) and the C input of 704 (710). Hence, raising 706 places both the source and target SDPs into C-mode.

While source SDP 700 is in C-mode, it will output its truth table via its D output 712. The replicator 702 redirects this bitstream to the D input 714 of the source, thus preserving the bits which would otherwise be lost from the end of the truth table. Additionally, the replicator copies this bit stream to the D input 716 of the target SDP. This effectively copies the truth table from the source 700 to the target 704. The previous truth table contained in 704 is sent out its D output 718 and is ignored by the replicator.

After 128 clock cycles, the truth table in 700 will be as it originally was, and the truth table in 704 will be a copy of the truth table in 700. Note however that unless line 706 is dropped at the proper time (exactly 128 clock ticks, or some positive multiple of 128 clock ticks), the truth tables in both 700 and 704 will not be the same as the original truth table in 700. Rather, the truth tables will be shifted by some number of bits depending on where in the 128-tick cycle the source and target left C-mode and reentered D-mode.

Figure 12:
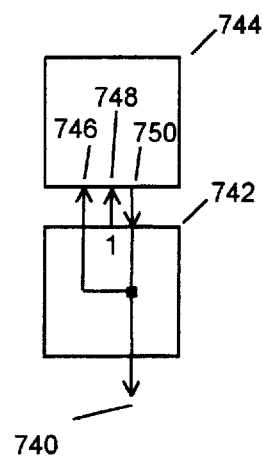
FIG. 12 shows a SDP circuit for generating pulses.

It is possible to control such a replication sequence by utilizing a circuit such as shown in FIG. 12. This circuit employs a SDP 744 with a fixed truth table (called a crystal), and a SDP 742 programmed similarly to a replicator (called a crystal controller). The controller 742 always asserts a True signal to the control input 748 of the crystal, so that 744 is always in C-mode. As such, 744 continually shifts its truth table and outputs the current highest bit to its D output 750. The controller 742 recirculates this bit via 746, hence the truth table in 744 constantly rotates, completing one cycle every 128 clock ticks.

Additionally, data output 750 is directed to 742's data output 740. Hence, a copy of the rotating truth table is presented to 740.

The equations for 742 are:

$$CN=1;\ DN=N;\ DS=N$$

Output 740 thus produces a periodic bit pattern, depending on the truth table in 744. For example, if 744 is programmed with the equation $$DE=NSWE\ \text{(a truth table with a single one and 127 zeroes)},$$

then 740 will be high for one clock tick, and low for the next 127 ticks. This pattern will repeat indefinitely, as the truth table in 744 is preserved via the feedback from 750 to 746. Hence, this circuit would output a pulse every 128 clock ticks. This can be combined with the replicator of FIG. 11 and some additional logic to perform controlled replications, i.e., replications which run for exactly 128 clock ticks, and leave the source and target SDPs with an exact copy of the original source truth table.

Other types of crystals 744 are also useful. For example, if the truth table in 744 is:

CN=1; CW=1; DN=1; DW=1 (a truth table with alternate columns filled with ones or zeroes), then the output 740 will alternate between zero and one every clock tick. This gives a clock which is synchronized with the system clock, but runs at half the frequency. A frequency doubler (such as a delay line and XOR) can be used to generate a clock with the same frequency as the system clock.

Crystals and crystal controllers such as those in FIG. 12 allow synchronization between internal SDP operations and the system-wide clock As such, these structures are critical to autonomous C-mode operations.

DESCRIPTION AND OPERATION—SECOND EMBODIMENT

Figure 13:
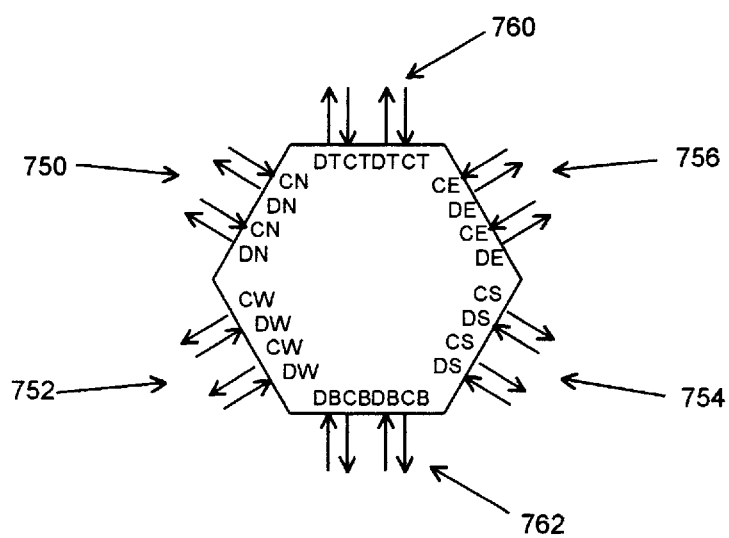
FIG. 13 shows a six-sided SDP.

A second embodiment of the present invention consists of six-sided SDPs arranged in a hexagonal two-dimensional grid. Such an arrangement has the advantage of providing more pathways through SDPs which are otherwise busy performing other tasks. FIG. 13 shows a picture of such a six-sided SDP.

Figure 14:
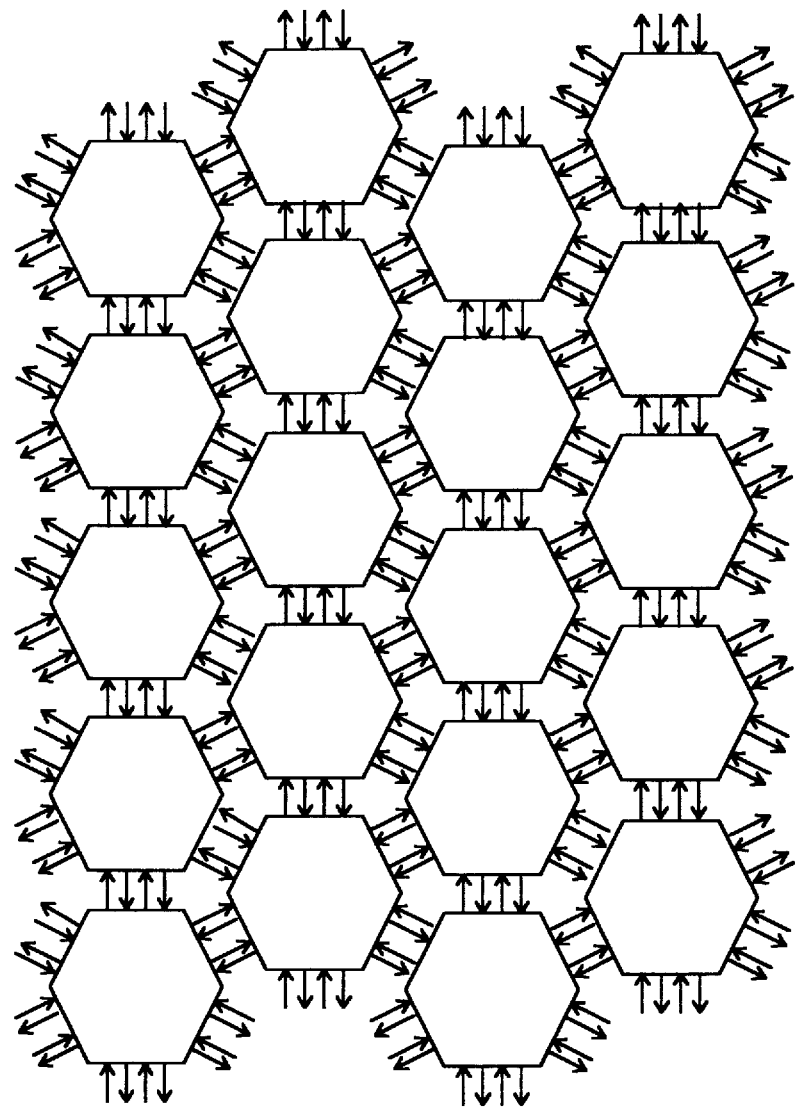
FIG. 14 shows a two-dimensional hexagonal array of six-sided SDPs.

750, 752, 754 and 756 correspond to the North, West, South and East sides of the four-sided SDP. Two additional sides, called the Top (760) and Bottom (762) are also incorporated in the six-sided SDP. As with the four-sided SDP, this SDP has six neighbors, and is connected to each neighbor via four lines (D input, D output, C input and C output). Again, the SDP exchanges a single bit of information with each neighbor, via the D lines. The meaning of that bit depends on the mode of the SDP, and the mode is determined by the C inputs. The C outputs control the mode of neighboring SDPs. Thus, the six-sided SDP functions identically to the four-sided SDP. FIG. 14 shows the two-dimensional hexagonal connection topology of a set of SDPs. Again, the general principle is identical to the two dimensional rectangular case.

Figure 15:
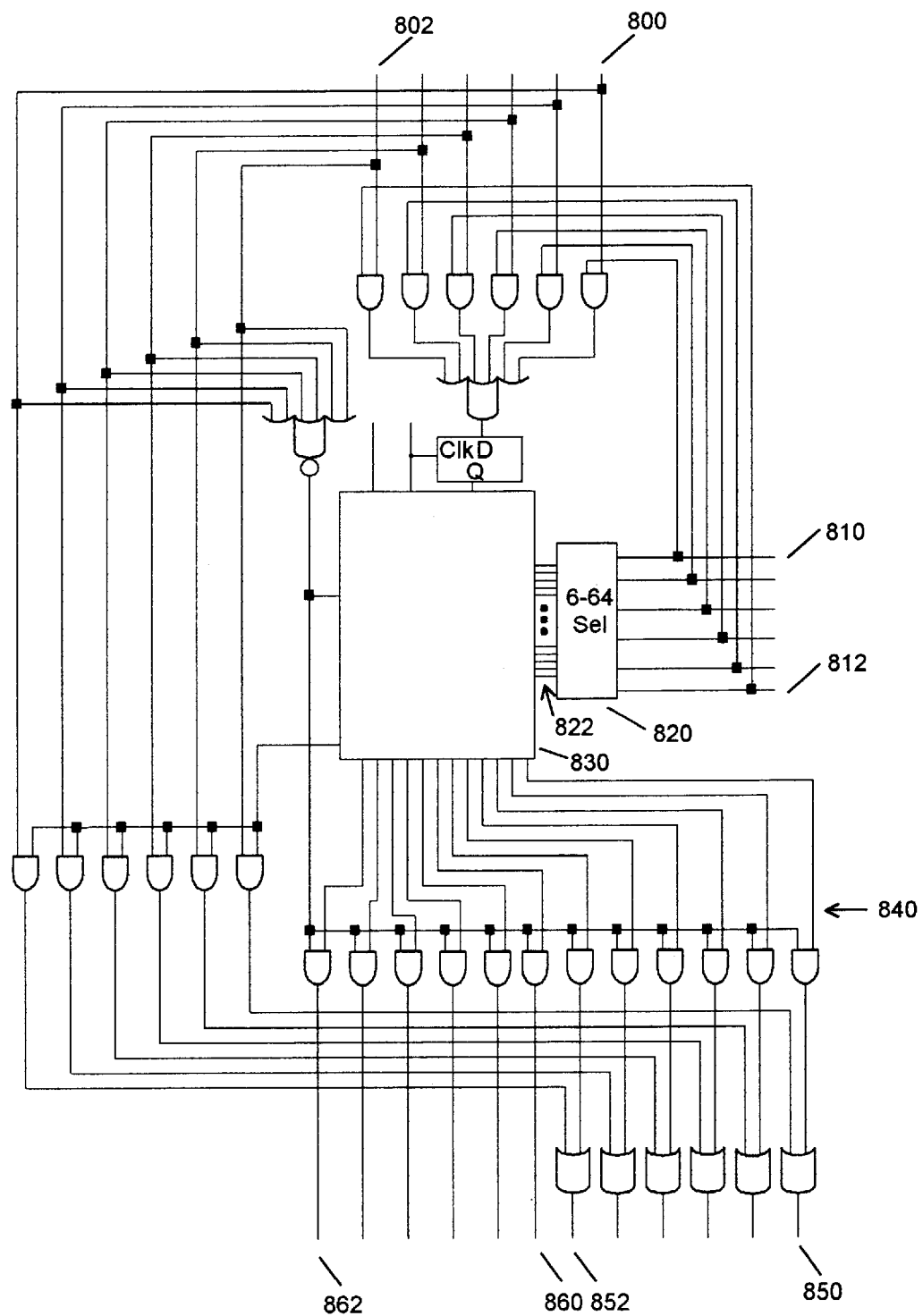
FIG. 15 shows a detailed schematic of a six-sided SDP.

FIG. 15 shows the internal schematic for a six-sided SDP, which is quite similar to FIG. 3. 800 is the control input from the Top, 802 is control from the Bottom, 810 is the data input from the Top, and 812 is data from the Bottom. The four additional outputs are data Top 852, data Bottom 850, control Top 862 and control Bottom 860. Selector 820 is a six-input 64-output selector. It asserts one of its 64 output lines 822 depending on the six inputs.

The select lines 822 enter shift register 830. 830 is functionally equivalent to FIG. 4 and FIG. 5, except that instead of a 128-element shift register, 830 contains 768 elements, organized in 64 rows by 12 columns. Hence the select lines 822 select a single row, whose 12 bits are sent to the outputs 840.

All the previous discussion of building arrays from individual SDPs and building larger arrays from smaller ones apply to this six-sided SDP and hexagonal topology. Furthermore, the details of C-mode and D-mode operation are functionally equivalent to the four-sided case.

SUMMARY, RAMIFICATIONS, AND SCOPE

From the above descriptions, it can be seen that a SDP-based processing system offers not only extreme flexibility in the functioning of each element, but also the ability of any element to modify any neighboring element (as well as non-adjacent elements, through proper configuration of other SDPs). This fundamental capability makes possible such things as hardware libraries, virtual circuits, and self-replicating circuits. By virtue of the SDP's inherent self duality, the system can be scaled to larger sizes without introducing bottlenecks, expanding address busses, or reducing the parallelism potential of the reconfiguration controllers.

While the above descriptions contain many specificities, these should not be construed as limitations on the scope of the invention, but rather as exemplifications of two preferred embodiments thereof. Many other variations are possible. For example, there are other connection topologies which are possible for the six-sided SDP. A set of six-sided SDPs can be organized in a three-dimensional cube arrangement, where we could associate North and South with +Y and −Y (in a Cartesian coordinate system), East and West with +X and −X, and Top and Bottom with +Z and −Z. For this topology (or any other involving six-sided SDPs), the configuration of an individual SDP is unchanged, and still reflected by FIG. 15. It is only in the programming of SDPs to work together that the higher-level topology is important. At the SDP level, this topology is irrelevant.

Furthermore, the specific circuits used to implement SDPs are irrelevant, as are the details of the fabrication technology (which need not even be electrical in nature), as long as the SDPs are functionally equivalent to what has been specified above.

Accordingly, the scope of the invention should be determined not by the embodiments illustrated, but by the appended claims and their legal equivalents.

What is claimed is:

1. A programmable logic device comprising:
   (a) a first plurality of input channels,
   (b) a means of computing the value of a binary state variable from said first plurality of input channels,
   (c) an internal storage memory accessible as either a serial read serial write shift register or as a parallel read random access memory, depending on the value of said binary state variable,
   (d) a second plurality of input channels which correspond one to one with said first plurality of input channels,
   (e) a means of combining said first plurality of input channels and said second plurality of input channels to specify serial input data for said shift register,
   (f) a means of addressing said random access memory using said second plurality of input channels,
   (g) a plurality of output channels, each of which correspond to either one of said first plurality of input channels or one of said second plurality of input channels,
   (h) a means of setting the values of said plurality of output channels by combining said first plurality of input channels with either the serial output or parallel outputs of said internal storage memory, depending on the value of said binary state variable, and
   (i) a means of shifting said shift register's contents based on the value of said binary state variable and an externally applied clock,
   whereby said programmable logic device can map inputs to output via said internal storage memory, or can present the contents of said memory to certain of its outputs and can load the contents of said memory from certain of its inputs.

2. The programmable logic device of claim 1, where said binary state variable is computed by logically ORing said first plurality of input channels.

3. The programmable logic device of claim 1, where said serial input data is computed by logically ORing each of said first plurality of input channels with each of said second plurality of input channels, and then logically ORing the resulting values, whereby said serial input data may be set high by setting any of said first plurality of input channels high, and also setting the corresponding channel from said second plurality of input channels high.

4. The programmable logic device of claim 1, where said internal storage memory is a shift register organized into rows and columns, such that
   (a) the number of rows is equal to $2^N$, N being the number of input channels in said second plurality of input channels,
   (b) the number of columns is equal to $2^M$, M being the number of output channels in said plurality of output channels,
   (c) a single row is selected using said second plurality of input channels as a row address,
   (d) the corresponding column values in said row are presented to said plurality of output channels when said binary state variable is low,
   (e) each output channel corresponding to said first plurality of input channels is driven low when said binary state variable is high,
   (f) each output channel corresponding to each input channel of said second plurality of input channels is set to the output value of said shift register if the input channel from said first plurality of input channels which corresponds to said input channel of said second plurality of input channels is high and said binary state variable is also high, and
   (g) each output channel corresponding to each input channel of said second plurality of input channels is driven low if the input channel from said first plurality of input channels which corresponds to said input channel of said second plurality of input channels is low and said binary state variable is high, whereby said internal storage memory functions as a truth table for mapping said second plurality of input channels to said plurality of output channels when said binary state variable is low, and said internal storage memory functions as a shift register whose single output value is sent to certain of said plurality of output channels depending on the values of said first plurality of input channels.

5. The programmable logic device of claim 1, where said internal storage memory functions as a shift register, shifting one bit each time an external clock makes a certain transition and the value of said binary state variable is high.

6. The programmable logic device of claim 1, where said internal storage memory includes a preset line, whereby each bit in said internal storage memory may be initialized to a predetermined value by application of a single preset signal.

7. A collection of programmable devices, each connected to a set of identical neighboring programmable devices according to a predetermined notion of neighborhood and a predetermined interconnection scheme, where each said programmable device comprises:
  (a) a first plurality of input channels,
  (b) a means of computing the value of a binary state variable from said first plurality of input channels,
  (c) an internal storage memory accessible as either a serial read serial write shift register or as a parallel read random access memory, depending on the value of said binary state variable,
  (d) a second plurality of input channels which correspond one to one with said first plurality of input channels,
  (e) a means of combining said first plurality of input channels and said second plurality of input channels to specify serial input data for said shift register,
  (f) a means of addressing said random access memory using said second plurality of input channels,
  (g) a plurality of output channels, each of which correspond to either one of said first plurality of input channels or one of said second plurality of input channels,
  (h) a means of setting the values of said plurality of output channels by combining said first plurality of input channels with either the serial output or parallel outputs of said internal storage memory, depending on the value of said binary state variable, and
  (i) a means of shifting said shift register's contents based on the value of said binary state variable and an externally applied clock.

8. The collection of programmable devices of claim 7, where
  (a) the number of said neighboring programmable devices is the same as the number of input channels in said first plurality of input channels,
  (b) the number of channels in said second plurality of input channels is the same as the number of channels in said first plurality of input channels,
  (c) the number of channels in said plurality of output channels is twice the number of channels in said first plurality of input channels,
  (d) the interconnection among said programmable devices is such that, for any two neighboring devices,
    i) a channel from said first plurality of input channels of one device is connected to a channel from said plurality of output channels of the other device,
    ii) a channel from said second plurality of input channels of one device is connected to a channel from said plurality of output channels of the other device,
    iii) one channel from said plurality of output channels of one device is connected to a channel from said first plurality of input channels of the other device,
    iv) one channel from said plurality of output channels of one device is connected to a channel from said second plurality of input channels of the other device,
whereby each said programmable device has its inputs connected to the outputs of other programmable devices, and its outputs connected to the inputs of other programmable devices.

9. The collection of programmable devices of claim 8, where certain of said programmable devices are connected to fewer neighboring programmable devices than others, whereby the corresponding unconnected input and output channels may be accessed by external devices.

10. The collection of programmable devices of claim 7, where a common dock signal is propagated to a plurality of said programmable devices, whereby multiple devices may be clocked simultaneously by application of a single dock.

11. The collection of programmable devices of claim 7, where a common preset signal is propagated to a plurality of said programmable devices, whereby multiple devices may each be set to its predetermined initial state by application of a single preset signal.

12. A configuration of two programmable devices, called a replicator and a source, each comprising:
  (a) a first plurality of input channels,
  (b) a means of computing the value of a binary state variable from said first plurality of input channels,
  (c) an internal storage memory accessible as either a serial read serial write shift register or as a parallel read random access memory, depending on the value of said binary state variable,
  (d) a second plurality of input channels which correspond one to one with said first plurality of input channels,
  (e) a means of combining said first plurality of input channels and said second plurality of input channels to specify serial input data for said shift register,
  (f) a means of addressing said random access memory using said second plurality of input channels,
  (g) a plurality of output channels, each of which correspond to either one of said first plurality of input channels or one of said second plurality of input channels,
  (h) a means of setting the values of said plurality of output channels by combining said first plurality of input channels with either the serial output or parallel outputs of said internal storage memory, depending on the value of said binary state variable, and
  (i) a means of shifting said shift register's contents based on the value of said binary state variable and an externally applied clock,
with certain of the inputs of the replicator connected to certain of the outputs of the source, and certain of the outputs of the replicator connected to certain of the inputs of the source, such that:
  (j) the replicator can, under certain conditions, assert one of the source's said first plurality of input channels, to cause the source's internal storage memory to act as a shift register,
  (k) the output of the source's internal storage memory is passed to one of the replicator's said second plurality of input channels, (l) the replicator's internal storage memory is preconfigured such that the data entering said one of the replicator's said second plurality of input channels is transferred to one or more of the replicator's output channels under certain combinations of inputs on the replicator's other inputs, whereby the contents of the source's internal storage memory is presented on one or more of the replicator's outputs, one bit at a time, in synchronization with the clock input to the source.

13. The configuration of programmable devices of claim 12, where the bits of the source's internal storage memory are additionally output to the replicator's output which is connected to one of the source's said second plurality of inputs, whereby the internal storage memory of the source is recirculated and thereby periodically restored to its initial condition.

14. The configuration of programmable devices of claim 12, where the source is connected to a third programmable device, called the target, such that:

(a) the replicator can, under certain conditions, assert one of the target's first plurality of input channels, to cause the target's internal storage memory to act as a shift register, (b) the output of the replicator which reflects the source's internal storage memory's contents is presented to one of the target's second plurality of inputs channels, whereby the contents of the source's internal storage memory is copied into the target's internal storage memory.

15. The configuration of programmable devices of claim 14, where the bits of the source's internal storage memory are additionally output to the replicator's output which is connected to one of the source's said second plurality of inputs, whereby the internal storage memory of the source is recirculated and thereby periodically restored to its initial condition.

16. The configuration of programmable devices of claim 15, where the replicator need not be a neighbor of the source and the target, but where a collection of intervening programmable devices pass inputs to outputs, such that the replicator copies the internal storage memory of a not necessarily adjacent source device into the internal storage memory of a not necessarily adjacent target device.

17. The configuration of programmable devices of claim 12, where the source device's internal storage memory is preloaded with a fixed bit pattern, such that the replicator generates a periodic sequence of bits on one or more of its outputs, depending on the values of certain of its second plurality of inputs.

* * * * *